United States Patent Office 3,520,132
Patented July 14, 1970

3,520,132
STORED AIR SUPERCHARGER FOR RECIPROCATING INTERNAL COMBUSTION ENGINE WITH CONSTANT PRESSURE COMBUSTION
Glenn B. Warren, 1361 Myron St., Schenectady, N.Y. 12309
Continuation-in-part of application Ser. No. 806,159, Mar. 11, 1969. This application June 18, 1969, Ser. No. 834,335
Int. Cl. F02g 3/00
U.S. Cl. 60—39.6    7 Claims

ABSTRACT OF THE DISCLOSURE

A stored air supercharging system is provided for a reciprocating engine with constant pressure combustion in a combustion chamber separated from the compression and power cylinders. The system includes a reservoir supplied through an air cooler by the compression cylinder discharge, as well as means for controlling and limiting the increased air and fuel furnished to the combustion chamber. At times of increased power requirements, a small quantity of air may be bled into the inlet of the combustion chamber with additional fuel to provide additional horse power without creating excessive pressure or temperature in the combustion chamber.

CROSS REFERENCE TO OTHER APPLICATIONS

The present application constitutes a continuation-in-part of patent application Ser. No. 806,159 filed on Mar. 11, 1969 for a Reciprocating Internal Combustion Engine with Constant Pressure Combustion.

BACKGROUND OF THE INVENTION

It has long been known to use superchargers to increase the output power of engines when required, such as during periods of acceleration. For example, many diesel trucks are provided with exhaust driven (turbine) superchargers. Such superchargers are not, however, adaptable to conventional automotive needs.

In the above referenced parent application, a constant pressure combustion engine having a combustion chamber separated from the compression and power cylinders is described. Although such engines can operate safely and efficiently under normal driving conditions, a segment of the driving public demands high performance and increased acceleration capabilities from their automobiles. Conventional exhaust driven (turbine) supercharging may be utilized with the proposed constant pressure combustion engine, however, such turbine supercharging has the inherent drawback of requiring some of the primary power of the engine to drive the supercharger, even at the time that the additional power is needed most (i.e., during acceleration), and in addition is somewhat sluggish in response to need for more power.

SUMMARY OF THE INVENTION

It is, therefore, the principal object of the present invention to provide a new and improved supercharging system for use with an internal combustion engine having constant pressure combustion in a combustion chamber separated from the compression and power cylinders utilizing stored supercharging air. The supercharging system includes a reservoir adapted to contain a supply of air under pressure and to deliver part of the air supply to the combustion chamber as required for supercharging. The reservoir is fed by a small second stage compressor which in turn receives compressed air from the main engine compressor. Additional fuel is also fed to the combustion engine during periods of supercharging, as required. Acceleration and exhaust temperature sensitive controls serve to automatically prevent overfeeding of the additional fuel to the engine during supercharging by overriding the fuel pump control and hence limiting the amount of excess fuel furnished the engine, in the event that preselected safety limits are exceeded.

BRIEF DESCRIPTIONS OF THE DRAWINGS

Figure 1:
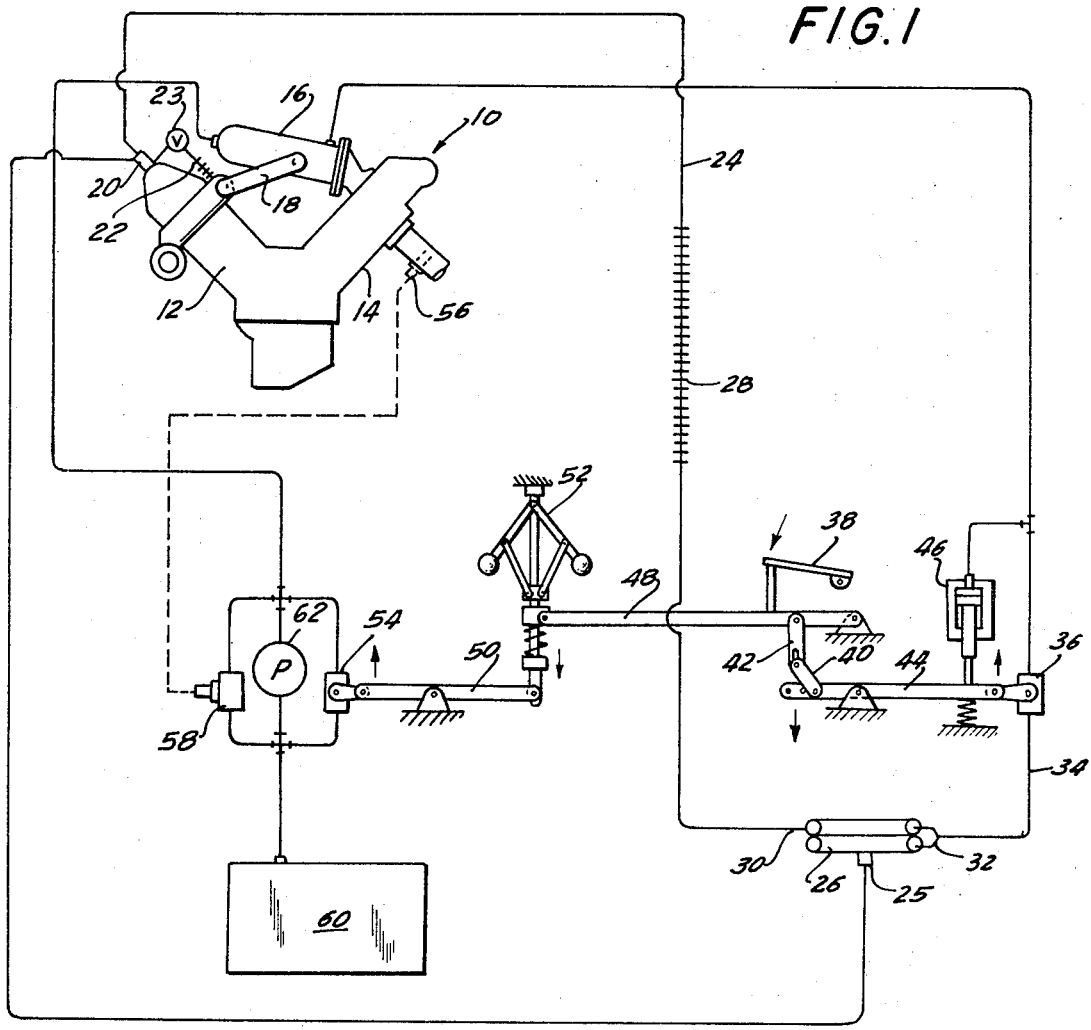
Figure 2:
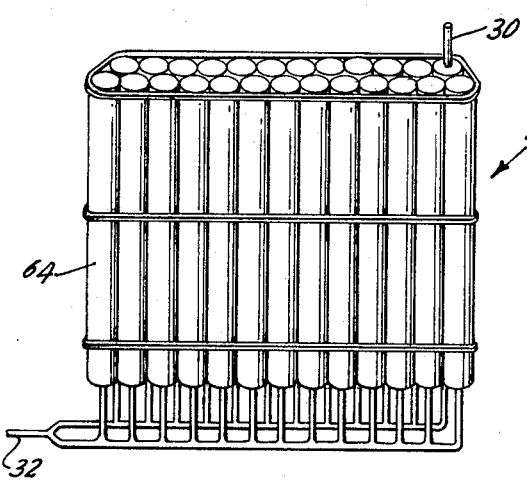

In the accompanying drawing:
FIG. 1 is a schematic representation of a supercharging system in accordance with the present invention; and
FIG. 2 is a perspective view of a stored air reservoir that may be used in the present system.

DETAILED DESCRIPTION OF THE PREFERRED EMBODIMENT

The present invention is illustrated in the accompanying drawing wherein similar components bear the same reference numeral throughout both views. Reference is now made to FIG. 1 wherein a schematic representation of a supercharging system in accordance with the present invention is depicted. The supercharging system of the present invention is adapted for use with an internal combustion engine 10 having relatively constant pressure combustion in a combustion chamber separated from the compression and expansion cylinders. Accordingly, the engine 10 is provided with at least one compression cylinder 12 and one power cylinder 14 separated by a combustion chamber 16. As was discussed in detail in the parent application, such an engine may be in-line or of the V-type, such as the conventional V–8 engine.

The compression cylinder 12 serves to receive a quantity of air through a suitable inlet port, to compress the same, and thereafter, to deliver the compressed air to combustion chamber 16 through a suitable conduit 18. In accordance with the present invention, a second stage compressor 20 is provided which receives a relatively small portion of the compressed air from the outlet of compression chamber 12 through one-way valve 23, cools the air by passing it through a suitable cooling device 22, and thereafter further compresses the air. The supercharging compressor 20 need only be a second stage compressor since the main compression would occur in cylinder 12. The second stage compressor 20 may, for example, be driven by a cam on the main cam shaft or electrically operated. The second stage compressor need only be large enough to restore pressure to the storage reservoir over several minutes since under normal conditions, the times of full supercharged power required are few and rather far between. The cooling device 22 comprises a finned pipe through which the air passes. The length of the cooling pipe would be determined by the desired temperature drop and if required, additional cooling may be obtained by subjecting the pipe to the radiator fan air discharge.

The compressed air is fed through conduit 24 to the stored air reservoir 26. In this connection, the compressed air is further cooled by passing it through cooling pipe 28 prior to storage. Reservoir 26 includes an inlet port 30 in communication with conduit 24 and an outlet port 32. A conduit 34 connects the outlet port 32 of reservoir 26 with combustion chamber 16. Pressure sensing means 25 are provided in communication with the reservoir interior. When the reservoir pressure reaches a preset limit, as determined by sensing means 25, the second stage compressor 20 is cut out until the pressure falls below this level. The means for cutting off compressor 20 would, of course, depend upon its construction.

The flow of air through conduit 34 to the combustion chamber 16 is governed by valve 36 which, in turn, is operatively connected by a suitable linkage to the accelerator pedal 38 of the automobile. Thus, when the accelerator pedal 38 is depressed beyond a predetermined point, link 40 will be engaged by link 42 and will in turn cause link 44 to rotate thereby causing valve 36 to open. An over pressure cutback 46 is also provided. Mechanism 46 is adapted to sense the combustion chamber pressure and, in the event the pressure exceeds a predetermined safe level, will close or reduce the opening of valve 36. The automobile may also be provided with a suitable gauge that would warn the operator if the combustion chamber pressure were approaching its upper limit.

The acceleration pedal 38 is also connected to the fuel feed control system through linkages 48 and 50. This consists basically of a fuel pump, preferably driven by suitable means from the engine shaft and of the positive displacement type. Suitable valved by-pass connections or other means are provided to permit control of the fuel fed to the combustion chamber at any given speed. In this connection, a speed governor 52 is provided in line with the fuel feed control linkage adapted to limit the flow of fuel by means of by-pass valve 54 and thereby control the amount of fuel provided to the engine at any given speed. The preferred arrangement of the pump 62 is a pump with a constant or fixed displacement per revolution of the pump, and hence of the engine, with controls which will permit a reduction of the fuel pumped in response to the needs. In this way the pump will have been proportioned so that at any speed when un-by-passed, it will be able to furnish all of the fuel that can be used by the air which will be compressed or otherwise made available at that speed. Lesser amounts can then be obtained by by-passing some of the fuel pumped back to the inlet of the pump, throttling the inlet or reducing the pump piston stroke, all of which are present alternative methods of reducing and controlling the fuel delivered by such a fuel pump. Alternative means of driving the pump could be used, but control would be much more difficult. The speed governor determines the amount of fuel to keep the engine at any speed which is determined by the position of accelerator 38. When the accelerator comes clear up, the speed governor in that position against an adjustable idle position stop determines and holds the idle speed of the engine. The speed governor also serves to prevent the exhaust temperature of the engine from going too high by fixing the amount of fuel delivered in accord with the load at any speed. This exhaust temperature control may additionally, or alternately, be accomplished directly by means of the exhaust temperature sensing element 56 and fuel by-pass control valve 58. Thus, in the event the exhaust temperature exceeds a preselected limit as determined by the sensing element 56, by-pass valve 58 will be suitably opened to reduce the amount of fuel provided by fuel pump 62 to the engine and thereby reduce the exhaust temperature. Both of these controls thus serve to limit the quantity of fuel furnished from the fuel tank 60 by engine driven pump 62 to the engine.

In FIG. 2, a proposed embodiment of the stored air reservoir 26 is illustrated. The reservoir comprises a plurality of elongated tubes 64 interconnected by common inlet and outlet manifolds. Such a reservoir may be installed in back of the rear seat of an automobile in front of the trunk in which position it would be well protected in case of any collision. The manifolds and tubes should be kept as small as possible so as to minimize the destructive effect of any rupture.

In operation, the compressed air will tend to have moisture separate out and drop to the bottom of the storage reservoir. This small amount of water would be forced into the combustion chamber with the compressed air on the first actuation of the supercharger. No harm would be done, except that a slight lack of full power response and perhaps some smoke emission from the exhaust might result. This could be obviated, if desired, by providing any well known means for separating the water of condensation from the compressed air at 32 or in pipe 34.

Having thus described the invention, what is claimed is:

1. A supercharging system for an internal combustion engine having relatively constant pressure combustion in a combustion chamber separated from the compression and expansion cylinders adapted to provide increased air and fuel to the engine combustion chamber when required comprising:
 an air storage reservoir adapted to contain a supply of pressurized air;
 conduit means extending between said reservoir and said engine combustion chamber;
 first-valve means disposed within said conduit and controlling the flow of air therethrough;
 second-valve means disposed within the engine fuel line and adapted to control the flow of fuel therethrough to the combustion chamber;
 means for controlling said first-valve means; and
 linkage means extending between said first-valve means and said second-valve means, said linkage means being adapted to actuate said second-valve means upon actuation of said first-valve means.

2. The invention in accordance with claim 1 further comprising speed-governing means in contact with said second-valve means whereby to reduce the flow of fuel to said engine in the event the speed of said engine exceeds a pre-selected limit, and also to control the idle speed of said engine.

3. The invention in accordance with claim 1 further comprising temperature sensing means adapted to measure the exhaust temperature of said engine and valve control means responsive to said temperature sensing means adapted to prevent further increase in the flow of fuel to said engine in the event the temperature of said engine reaches a pre-selected limit.

4. The invention in accordance with claim 1 further comprising pressure sensing means in operative contact with said combustion chamber and first-valve control means responsive to said pressure sensing means adapted to prevent the further increase in the flow of air from said storage reservoir to said combustion chamber in the event the pressure within said chamber reaches a pre-selected limit.

5. The invention in accordance with claim 1 further comprising an inlet to said storage reservoir conduit means extending between said inlet and the air compression cylinder of said engine, and supercharging air compression means interposed between said engine compression cylinder and said storage reservoir inlet.

6. The invention in accordance with claim 5 further comprising first air cooling means interposed between the outlet of said supercharging air compressing means and the inlet to said storage reservoir.

7. The invention in accordance with claim 6 further comprising second air cooling means interposed between said air compression cylinder and said supercharging air compression means.

References Cited

UNITED STATES PATENTS

| | | | |
|---|---|---|---|
| 1,156,534 | 10/1915 | Latady | 60—39.6 |
| 1,328,160 | 1/1920 | Lawn | 60—39.6 |
| 3,407,594 | 10/1968 | McComb | 60—39.6 |

WENDELL E. BURNS, Primary Examiner

U.S. Cl. X.R.

123—119